United States Patent [19]

Prescott

[11] 4,283,063
[45] Aug. 11, 1981

[54] SELF ALIGNING INSTALLATION RESISTANT LUBRICANT SEAL

[75] Inventor: David B. Prescott, Littleton, Colo.

[73] Assignee: The Mechanex Corporation, Englewood, Colo.

[21] Appl. No.: 163,181

[22] Filed: Jun. 26, 1980

Related U.S. Application Data

[63] Continuation of Ser. No. 41,178, May 21, 1979, abandoned.

[51] Int. Cl.³ .............................................. F16J 15/34
[52] U.S. Cl. ..................................... 277/37; 277/153
[58] Field of Search ............... 277/152, 153, 213, 214, 277/215, 35, 37

[56] References Cited

U.S. PATENT DOCUMENTS

| | | | |
|---|---|---|---|
| 4,037,848 | 7/1977 | Prescott et al. | 277/37 |
| 4,037,849 | 7/1977 | Thumm | 277/37 |

Primary Examiner—Robert I. Smith
Attorney, Agent, or Firm—Thomas E. Torphy; James R. Hagen

[57] ABSTRACT

Annular sealing ridges on a sealing surface of a lubricant seal for sealing between a bore and a shaft are configured and oriented to resist installation by axial movement onto the shaft on which they seal to aid in preventing over-installation of the seal on the shaft and to aid in assuring proper alignment of the seal components and axial sealing of the seal within the bore.

1 Claim, 4 Drawing Figures

SELF ALIGNING INSTALLATION RESISTANT LUBRICANT SEAL

This is a continuation of application Ser. No. 041,178, filed May 21, 1979 and now abandoned.

BACKGROUND OF THE INVENTION

Lubricant seals, such as those seals used to seal between an axle of a vehicle and a bore in a wheel hub are often not visible after they are installed and the only way generally available to determine an ineffectively installed seal is by visual observation of lubricant which leaks past the seal.

When heavy assemblies, such as a dual wheel assembly for a vehicle, are installed onto the axle of a vehicle, such as an over-the-road tractor or trailer, the assembly is often carefully aligned with the axle with the seal positioned in a bore of the wheel hub and then forced axially onto the axle. Sometimes, due to the velocity with which the assembly is forced onto the axle, the lubricant seal, due to inertia, does not stop when the wheel assembly is forced to stop by being seated on the bearings. The resulting over-travel or over-installation of the seal axially along the shaft or axle causes the seal to partially withdraw from the bore in the wheel hub and consequently renders the assembly susceptible to leakage.

A second cause of a leaking seal is improper placement or seating of the seal into the bore of the assembly prior to installation of the assembly onto the axle. Here again, as with the over-installed seal, the assembly is susceptible to leakage due either to a lack of sealing between the seal and the wheel hub or due to a misalignment of the components of the seal itself whereby upon rotation of the wheel assembly relative to the axle the skewed position of the seal relative to the longitudinal axis of the axle and the bore mounted coaxial with the axle forces the seal components into an unsealed relationship with each other to enable undesireable leakage of lubricant from the hub of the wheel assembly.

BRIEF SUMMARY OF THE INVENTION

In the present invention the resistance to axial movement of an axle engaging annular member of a lubricant seal onto an axle is designed to be substantially greater than the resistance to axial movement of a bore engaging member into a bore of an assembly, such as a wheel hub, to assure that the seal is properly seated in the bore before being sealingly seated in its proper axial position on the axle.

Substantially annular sealing ridges sealingly engaged with a radially inwardly facing surface of an axle receiving aperture of the lubricant seal are configured and oriented to resist installation onto a radially outwardly facing surface of the axle when the seal is slid axially onto the axle. The resistance to axial sliding of the axle engaging member onto the axle is greater than the resistance to axial sliding of the bore engaging member into the bore whereby the seal is forced into contact with a seal limit or stop in the bore and then forced to its proper axial position on the axle.

DETAILED DESCRIPTION OF INVENTION

Figure 1:
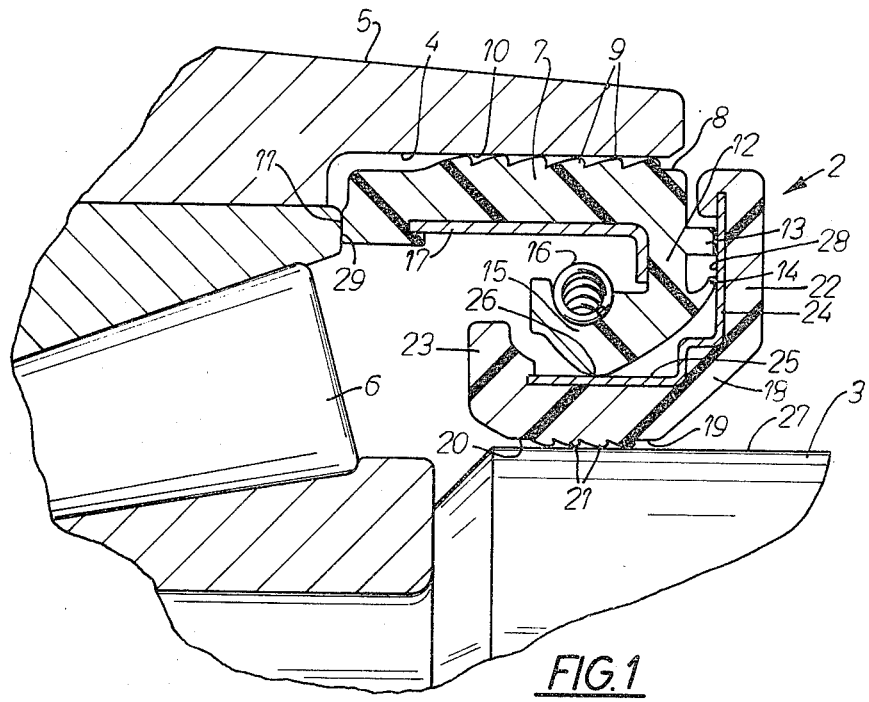
FIG. 1 shows in a partial view a cross sectional view of an annular lubricant seal mounted in a typical vehicle wheel hub and axle assembly.

FIG. 1 shows in a partial view a cross sectional view of a lubricant seal assembly 2 installed into a typical bore and shaft assembly, such as vehicle axle or shaft 3 and a bore 4 in a vehicle wheel hub 5. Hub 5 is mounted for rotation on axle 3 and friction reducing means, such as conventional tapered roller bearings 6, are interposed between the axle 3 and hub 5 to facilitate such rotation. A lubricant, not shown, such as grease or oil is normally placed within hub 5 to reduce friction. Seal 2 prevents the lubricant from leaking out of the hub and also prevents contaminants such as water and particulate matter from getting into the hub to contaminate the lubricant.

Seal assembly 2 is comprised of a substantially annular resilient member 7 having a radially outwardly facing substantially cylindrical surface 8. Radially outwardly facing surface 8 has a plurality of radially outwardly projecting resilient seal rings 9 sealing engaged with it. Seal rings 9 form a seal with, and also achieve substantial frictional contact with, a radially inwardly facing surface 10, which defines bore 4.

To facilitate description of this invention "inboard" as used herein defines an axial position of a seal component or feature which is relatively adjacent or faces towards a vehicle or mechanism on which the seal is or may be installed and "outboard" as used herein defines an axial position of a seal component or feature which is relatively adjacent or faces towards the assembly, such as a wheel assembly, which is or is to be, installed onto the vehicle or mechanism.

Member 7 additionally has an axially outboard projecting end stop surface or member 11, a radially inwardly projecting web 12 having a plurality of axially inboard projecting spacer tabs, such as spacer tab 13, an axially inboard projecting auxilliary seal lip 14, an annular seal band 15 and a resilient radially inwardly urging means engaged with said seal band, such as garter spring 16. A substantially annular rigid member 17 provides axial and radial support for resilient member 7.

Members 7 and 17 comprise a subassembly which forms the wheel engaging component of seal 2 and this component rotates with and is sealingly engaged with bore 4.

Seal 2 is further comprised of a substantially annular resilient member 18 having a shaft or axle receiving aperture 19 defined by radially inwardly facing surface 20. A plurality of resilient substantially annular seal rings 21 are sealingly engaged with surface 20. Seal rings 21 sealingly and frictionally engage a plurality of continuous annular portions of a radially outwardly extending web member 22 extending from an axial inboard end and a radially outwardly extending assembly maintenance rim 23 extending from an axial outboard end. A substantially annular rigid member 24 is sealingly engaged with resilient member 18 and rigid member 24 and resilient member 18 form a subassembly of seal 2. Rigid member 24 has a radially outwardly facing substantially cylindrical wear surface 25. A seal lip 26 on seal band 15 sealingly engages a continuous annular portion of wear surface 25 and upon rotation of bore 4 relative to axle 3 seal lip 26 and wear surface 25 form a running seal. The seal so formed thus prevents lubricant from leaking out of the hub under static and dynamic conditions.

The auxiliary seal lip 14 sealingly engages a wear surface comprised of a continuous circular portion of an axially outboard facing surface 28 of rigid member 24. The plurality of spacer tabs 13 are affixed to an axially inboard facing surface of web 12 and extend axially inboard from member 7. An axially inboard termination of each of the spacer tabs is positioned to contact a portion of the axially outboard facing surface of rigid member 24 to assure proper alignment of the subassembly comprised of resilient member 18 and rigid member 24 relative to the subassembly comprised of resilient member 7 and rigid member 17. The spacer tabs also assure proper contact of auxiliary seal lip 14 with the wear surface it seals against on rigid member 24.

A typical installation of seal 2 generally consists of manually forcing the assembled seal into bore 4 until it is prevented from further axial movement due to seal stop surface 11 contacting a seal limit means such as axially inboard facing surface 29 of bearing assembly 6. The wheel hub 5 is then aligned with the end (not shown) of axle 3 and forced axially inboard whereby seal rings 21 are forced into frictional and sealingly engagement with surface 27 of axle 3. Upon tightening of the spindle nut (not shown) the sealing rings 21 are forced to slide axially inboard along axle 3 at which time seal 2 should be properly aligned and axially seated against limit means 29 and the subassembly comprised of resilient member 18 and rigid member 24 is properly aligned with the bore engaging subassembly by virtue of spacer tabs 13. Seal rings 21 would then be in their proper axial position on axle 3.

Figure 2:
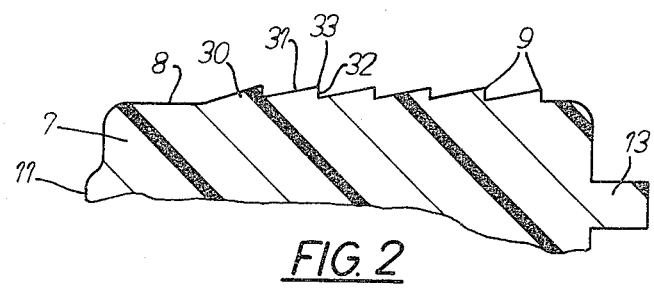
FIG. 2 shows in an enlarged cross sectional view the conventional seal ridges used on the resilient bore engaging member of the seal.

FIG. 2 is an enlarged cross sectional view of bore engaging seal rings 9 projecting radially outwardly from surface 8 of resilient member 7. Each of said seal rings 9 has a base portion 30 molded integral with surface 8 of resilient member 7. Each ring 30 has an axially outboard facing surface 31 projecting radially outwardly from surface 8 at an acute angle of about 30° and an axially inboard facing surface 32 projecting radially outwardly from surface 8 at about a 90° angle. Each ring 9 has a radial termination 33 formed by the intersection of surfaces 31 and 32. Relative to the internal diameter of bore 4, the outside diameter of rings 9 is such that upon axial insertion of seal 2 into bore 4 a compression fit is forced to occur between rings 9 and surface 10 which defines bore 4 whereby 9 are compressed radially inwardly.

The sloping outboard extending face 31 of each ring 9 facilitates the radial inward compression of each ring 9 and minimizes the axial force required to insert the seal axially into the bore.

In a typical prior art wheel oil seal manufactured by the assignee of the invention disclosed in this specification the axle engaging aperture of the resilient axle engaging member has a pair of substantially "O ring" axle engaging members molded integral with the surface defining the aperture and extending radially inwardly from the aperture defining surface. These axle engaging members, such as shown in U.S. Pat. No. 4,037,848, provide an adequate seal with the axle but, due to the ease with which they can be slid axially along the axle relative to the axial force required to insert the seal having seal rings 9 as described above into the bore of the wheel hub, over-installation and/or misaligned installation of the seal is possible and occasionally occurs.

Figure 3:
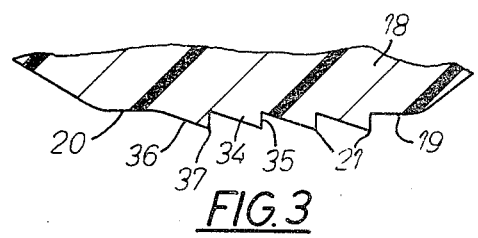
FIG. 3 shows in an enlarged cross sectional view the seal ridges of this invention prior to the seal being installed onto a shaft or axle.

FIG. 3 shows a typical configuration of the seal rings 21 of this invention prior to installation. Each of the seal rings 21 is sealingly engaged with the radially inwardly facing surface 20 which defines the axle receiving aperture 19 in resilient member 18.

Each seal ring 21 is comprised of a base portion 34 molded integral with surface 20. An axially inboard facing surface 35 of a ring 21 extends radially inwardly from surface 20 at substantially a 90° angle to surface 20 to form one side of each ring 21. An axially outboard facing surface 36 which extends radially inwardly from surface 20 at an acute angle, such as about 30°, as shown, forms the other side of each of the rings 21. Each seal ring 21 has a radially innermost termination 37 formed by the intersection of surfaces 35 and 36. The internal diameter of each of the rings 21 is sized to form a compression fit with axle 3 whereby the termination and at least a portion of the body of each seal ring is forced radially outwardly and consequently compressed as the aperture receives the axle.

Figure 4:
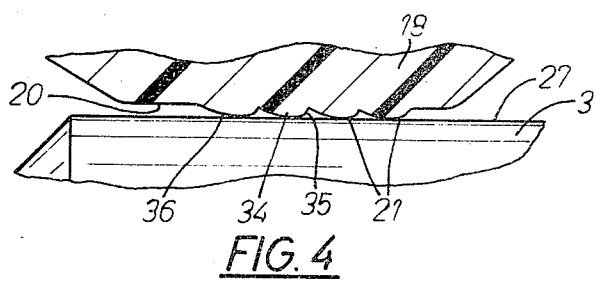
FIG. 4 shows the seal ridges of FIG. 3 after the seal has been installed onto a shaft or axle.

FIG. 4 shows the typical configuration of seal rings 21 after they have been installed on axle 3. Axial inboard movement of the resilient member 18 over axle 3 causes radial outward compression of each of the seal rings 21 and forces axially inboard facing surface 35 of each of the seal rings to slope at an acute angle to surface 20 as each seal ring termination is forced axially outboard due to the frictional force with which it contacts surface 27 of axle 3 as member 18 is forced axially inboard along axle 3. Axially outboard facing surface 36 of each seal ring 21 is consequently compressed and forced to assume a curved configuration as the resilient member 18 is forced axially along surface 27 of axle 3 during installation of the wheel hub 5 having seal 2 installed in bore 4 onto axle 3.

Due to the orientation of seal rings 21 relative to surface 27 of axle 3 the resistance to axial inboard sliding of seal rings 21 over surface 27 is significantly greater than the resistance to sliding of seal rings 9 axially outboard along surface 10 of bore 4. The significantly greater resistance to axial sliding of seal rings 21 inboard onto axle 3 relative to the resistance to axial sliding of seal rings 9 axially outboard along surface 10 of bore 4 results because the sloping surfaces 31 of rings 9 facilitate compression of the ring terminations 33 radially inwardly and thus reduce the force required to effect axial outboard sliding of the seal along the bore defining surface 10 whereas rings 21 on axle engaging member 18 present blunt, virtually unsloped or uninclined surfaces 35 to surface 27 of axle 3 whereby radial outward compression of the terminal portions 37 as the rings are forced over the axle is not facilitated by the geometrical configuration of surface 35. Consequently, upon installation of the wheel hub and seal onto the axle the seal tends to be forced axially outboard in bore 4 until it contacts limit means 29 and is then consistantly forced to slide axially inboard along axle 3 to come to its proper sealing position on the axle 3 as the spindle nut is turned to force the wheel hub assembly into its proper position on the axle. Thus, when the seal rings 21 are forced into their proper axial position on axle 3 the two seal subassemblies are assured of being properly aligned with each other and seal 2 is assured of being properly seated in the bore and in its proper axial position relative to the axle to provide maximum assurance of a leak proof installation.

What is claimed is:

1. In a vehicle wheel lubricant seal for sealing between a bore in a wheel hub and an axle insertable into said bore, said bore being rotatable with respect to said axle, said bore having a seal limit means for limiting axial movement of said seal into said bore, said seal comprising, in combination:

a first substantially annular member for sealingly and frictionally engaging and rotating with said bore;

a second substantially annular member for sealingly and frictionally engaging said axle;

spacer means on said first member for contacting said second member for maintaining said first member and said second member in a desired axial spaced relationship with respect to each other during installation of said seal onto said axle;

seal means on said first member for sealingly engaging a wear surface on said second member for effecting a seal between said first member and second member under static and dynamic conditions;

a first plurality of radially outwardly extending resilient seal ridges molded integral with and radially outwardly extending from said first member for sealingly and frictionally engaging said bore in said wheel hub, each of said plurality of seal ridges being formed of a first axially inboard facing substantially annular surface substantially normal to the axis of said seal and extending radially outwardly from said first member and a second annular substantially outboard facing sloping surface extending axially and radially outwardly from said first member, each of said surfaces intersecting to form a sharp angle radially outermost termination of each of said seal ridges;

a second plurality of at least four radially inwardly extending resilient seal ridges molded integral with and radially inwardly extending from said second member for sealingly and frictionally engaging said axle, each of said seal ridges being formed of a first axially inboard facing substantially annular surface substantially normal to the axis of said seal and extending radially inwardly from said member and a second annular substantially outboard facing sloping surface extending axially and radially inwardly from said second member, said surfaces intersecting to form a sharp angle radially innermost termination of each of said seal ridges whereby the resistance to axial sliding of said first plurality of said seal ridges into said bore is less than the resistance to axial sliding of said second plurality of said seal ridges onto said axle when said seal is placed in said bore of said wheel hub and said wheel hub is forced axially onto said axle.

* * * * *